United States Patent [19]
Lo et al.

[11] Patent Number: 5,132,888
[45] Date of Patent: * Jul. 21, 1992

[54] INTERLEAVED BRIDGE CONVERTER

[75] Inventors: David S. Lo, Burnsville; Joseph H. Mulkern, St. Paul, both of Minn.

[73] Assignee: Unisys Corporation, Blue Bell, Pa.

[*] Notice: The portion of the term of this patent subsequent to Apr. 16, 2008 has been disclaimed.

[21] Appl. No.: 637,735

[22] Filed: Jan. 7, 1991

[51] Int. Cl.$^5$ .............................................. H02M 3/335
[52] U.S. Cl. ........................................ 363/17; 363/132
[58] Field of Search ............................. 363/17, 98, 132

[56] References Cited

U.S. PATENT DOCUMENTS

| | | | |
|---|---|---|---|
| H335 | 9/1987 | Milberger et al. | 363/17 |
| 3,659,185 | 4/1972 | Gregorich | 321/2 |
| 4,071,812 | 1/1978 | Walker | 363/80 |
| 4,186,437 | 1/1980 | Cuk | 363/65 |
| 4,318,164 | 3/1982 | Onodera et al. | 363/21 |
| 4,535,399 | 8/1985 | Szepesi | 363/41 |
| 4,563,731 | 1/1986 | Sato et al. | 363/17 |
| 4,618,919 | 10/1986 | Martin, Jr. | 363/21 |
| 4,672,303 | 6/1987 | Newton | 323/285 |
| 4,685,039 | 8/1987 | Inou et al. | 363/16 |
| 4,691,273 | 9/1987 | Kuwata et al. | 363/132 |
| 4,691,275 | 9/1987 | Moscovici | 363/17 |
| 4,706,181 | 11/1987 | Mercer | 353/133 |
| 4,713,742 | 12/1987 | Parsley | 363/124 |
| 4,720,668 | 1/1988 | Lee et al. | 323/271 |
| 4,727,308 | 2/1988 | Huljak et al. | 323/222 |
| 4,734,839 | 3/1988 | Barthold | 363/16 |
| 4,739,461 | 4/1988 | Komatsu et al. | 363/20 |
| 4,747,035 | 5/1988 | Bobry | 363/24 |
| 4,761,727 | 8/1988 | Kammiller | 363/98 |
| 4,823,249 | 4/1989 | Garcia, II | 363/48 |
| 4,825,348 | 4/1989 | Steigerwald et al. | 363/132 |
| 4,855,888 | 8/1989 | Henze et al. | 363/17 |
| 4,866,586 | 9/1989 | Suko | 363/17 |
| 4,953,068 | 8/1990 | Henze | 363/17 |
| 5,008,795 | 4/1991 | Parsley et al. | 363/20 |

OTHER PUBLICATIONS

M. M. Jovanovic, C. S. Leu, F. C. Lee, "A Full-Bridge Zero Voltage-Switched Multi-Resonant Converter for Pulse-Load Applications, " Proceeding of APEC 90, Mar. 1990, pp. 109–110.
F. S. Tsai, P. Materu, F. C. Lee, "Constant-Frequency. Clamped-Mode Resonant Converters", Internal Report, Virginia Power Electronics Center, VPI&SU, Jun. 1987, pp. 557–566.
I. J. Pital, "Phase-Modulated Resonant Power Conversion Techniques for High Frequency Inverters," IEEE IAS Annual Meeting, Proceedings Apr. 1986.
K. Liu, F. C. Lee, "Resonant Switches-A Unified Approach to Improve Performances of Switching Converters," IEEE Intl. Telecommunications Energy Conference Proceedings, pp. 334–341, May 1984.
K. H. Liu, F. C. Lee, "Zero-Voltage Switching Technique in DC-DC Converters," IEEE PESC Record, pp. 58–70, Dec. 1986.

(List continued on next page.)

Primary Examiner—Steven L. Stephan
Assistant Examiner—Jeffrey Sterrett
Attorney, Agent, or Firm—Glenn W. Bowen; Mark T. Starr

[57] ABSTRACT

A DC to DC power converter is implemented which includes an input switching circuit, an input capacitor, a transformer and an output rectifying switching circuit coupled to the transformer. The input switching circuit consists of a minimum of four transistors which are operated in a timed relationship such that bi-directional currents are developed in both primary windings. The output rectifying switching circuit is operated with switching transistors that provide zero-voltage resonant transition (ZVRT) switching. Timing relationships between the input signals control the ZVRT with switching of the transistors. Bidirectional currents in the primary windings of the single transformer element permit a reduction in volume of the magnetic element and the coils of the transformer for a given level of output power. Overall, converter volume for a given output power is thereby sufficiently reduced to allow a power converter to be mounted on a circuit board, which enables a practical embodiment of a distributed power processing system.

1 Claim, 4 Drawing Sheets

OTHER PUBLICATIONS

R. Oruganti, F. C. Lee, "Effects of Parasitic Losses on the Performance of Series Resonant Converter," IEEE, Sep. 1985, pp. 1233–1243.

T. M. Undeland, "Snubbers for Pulse Width Modulated Bridge Converters with Power Transistors or GTOs," IPEC-Tokyo, Dec. 1983, pp. 313–323.

R. P. Severns, G. Bloom, *Modem DC-to-Dc Switchmode Power Converter Circuits*, Van Nostrand Reinhold Company, New York, Dec. 1985, pp. 169–171.

R. D. Middlebrook, S. Cuk, "A General Unified Approach to Modelling Switching-Converter Power Stages," Proceedings of the IEEE Power Electronics Specialists Conference, Jun. 1976, Cleveland, Ohio, pp. 73–89.

W. Fragale, B. Pelly, B. Smith, "The HEXFET'S Integral Reverse Rectifier-A Hidden Bonus for the Circuit Designer," Power Conversion International, Mar.-Apr. 1980, pp. 17–36.

R. A. Fisher, K. D. T. Ngo, M. H. Kuo, "A 500 kHZ, 250 W DC-DC Converter with Multiple Outputs Controlled by Phase-Shifted PWM and Magnetic Amplifiers," HFPC Proceedings, May 1988, pp. 100–110.

L. H. Mweene, C. A. Wright, M. F. Schlecht, "A 1 kW, 500 kHz Front-End Converter for a Distributed Power Supply System," IEEE, Mar. 1989, pp. 423–432.

S. Cuk, R. D. Middlebrook, *Advances in Switched-Mode Power Conversion*, TESLAco, Pasadena, Calif., Dec. 1983, pp. 35–43. See p. 38.

C. P. Henze, N. Mohan, "Modeling and Implementation of a Digitally Controlled Power Converter Using Duty Ratio Quantization," PESC Dec. 1985 Record.

R. Goldfarb, "A New Non-Dissipative Load-Line Shaping Technique Eliminates Switching Stress in Bridge Converters," Proceedings of Powercon 8, D-4, pp. 1–6, Dec. 1981.

C. P. Henze, H. C. Martin, D. W. Parsley, "Zero-Voltage Switching in High Frequency Power Converters Using Pulse Width Modulation," APEC, Feb. 1988, pp. 33–40.

D. S. Lo, C. P. Henze, "Development of a DC-to-DC Power Converter for Distributed Power Processing," APEC, Mar. 1989, pp. 5–8.

J. G. Hayes, N. Mohan, C. P. Henze, "Zero-Voltage-Switching in a Constant Frequency Digitally Controlled Resonant DC-DC Power Converter," IEEE Applied Power Electronics Conference (APEC) Proceedings, pp. 360–367, Feb., 1988.

INTERLEAVED BRIDGE CONVERTER

BACKGROUND OF THE INVENTION

1. Field of the Invention

This invention is related to zero-voltage, resonant transition switching DC-DC interleaved bridge converters 2. Description of the Background Art Modern DC-DC power converters generally include semiconductor switching elements, which when turned on and off couple energy from a DC source to an inductor in the converter. This energy is then transferred from the inductor to the DC output. Common DC-to-DC converter topologies include the buck (or forward) converter, the buck-boost (or flyback) converter, and the boost converter topologies.

Reliability, low cost and efficiency are all important considerations in power supply design. However, the features of high efficiency and high reliability generally are at odds with the feature of low cost. High reliability power supplies often contain bulky tantalum capacitors, a number of isolation transformers and smoothing chokes, and a variety of snubber components.

It is known that zero-voltage, resonant transition (ZVRT) switching can substantially reduce switching losses. ZVRT is the technique of changing the state of a control switch during a short duration of time when the voltage across the switch is approximately zero to substantially eliminate switching power losses in the switch. Examples of an interleaved flyback converter that uses such techniques is shown in U.S. Pat. No. 4,618,919, issued Oct. 21, 1986, entitled "Topology for Miniature Power Supply with Low voltage and Low Ripple Requirements" to Hubert C. Martin, Jr. and assigned to the assignee of the present invention. A full-bridge ZVRT multi-resonant converter was published in the Applied Power Electronic Conference Proceedings, pages 109-118 in March 1990 by Milan M Jovanovic, Ching-Shan Leu, and Fred C. Lee under the title "A Full-Bridge Zero-Voltage-Switched Multi-Resonant Converter for Pulse-Load Applications."

A number of U.S. Pat. Nos., including 4,823,249, Garcia, II; 4,747,035, Bobry; 4,739,461, Komatsu et al; 4,706,181, Mercer; and 3,659,185, Gregorich, show that power supply and converter circuits can be implemented with a single transformer. An article entitled "A New Non-Dissipative Load-Line Shaping Technique Eliminates Switching Stress in Bridge Converters" by Ron Goldfarb, which appeared in Proceedings of Powercon 8, D-4 pages 1-6, shows a non-dissipative bridge converter of a type that is described below with reference to FIG. 1. A full-bridge power converter with zero voltage resonant transition switching is shown in U.S. Pat. No. 4,953,068, issued Aug. 28, 1990, entitled "Full Bridge Power Converter with Multiple Zero Voltage Resonant Transition Switching" to Christopher P. Henze and assigned to the assignee of the present invention.

An interleaved forward DC-DC power converter with interleaved timing is disclosed in copending U.S. Pat. application Ser. No. 498,863, filed Mar. 23, 1990 in the names of David W. Parsley and Hubert C. Martin, Jr., which is assigned to the assignee of the present invention. In this invention two buck switching power stages are operated 180° out-of-phase, with the input nodes of a pair of inductors being coupled to a common filter capacitor. A secondary coil is wound on each inductor core which is switched to a load at the time the primary winding is shunted across the input filter capacitor. In this way, dual-inductor buck power operation is provided while maintaining input-output isolation.

An improved converter of the buck switching type is described in U.S. Pat. No. 4,713,742, "Dual-Inductor Buck Switching Converter," invented by David W. Parsley and assigned to the assignee of the present invention. In that invention a DC-to-DC power converter provided power to two parallel-connected inductors in series with a DC input power source. Commutation switches connected in series with each of the inductors were controlled to have a duty cycle that is greater than 50%. This duty cycle provided interleaved timing such that whenever one of the switches turns on or off, the other switch is still closed during the switching time. As a result of this construction, the sum of the currents that flow through the inductors provides an output current to the load with greatly reduced ripple and substantially constant output current.

In U.S. Pat. No. 4,618,919, a dual transformer switching topology provided isolation of the input and output power terminals. A storage capacitor applied at the input of the power supply was switched sequentially in accordance with an interleaved timing to provide continuous filter support for the output voltage produced by the power supply. The capacitor performed a filtering function for the output voltages and also stored energy at high voltages as a result of the turns ratio of the power supply transformer. This permitted the use of a capacitor with reduced physical size and capacity. The Martin patent was of the interleaved flyback converter type which, however, lacks inherent stability over a wide band of attenuation of input ripple.

In a paper entitled "Zero-Voltage Switching in High Frequency Power Converters Using Pulse Width Modulation," by C.P. Henze, et al, IEEE Applied Power Electronics Conference (APEC) Record, pp. 33-40, February 1988, a zero-voltage switching technique employing resonant transition during a switching interval of short, but finite, duration was discussed. This technique is applicable to conventional power converter topologies and offers efficient operation at very high switching frequencies while retaining the fundamental characteristics of the conventional topology. With this design power transistor parasitic capacitor switching losses are eliminated, and the voltage stress of the power transistor during changing state was not increased, but these advantages were obtained at the expense of increased conduction losses and a requirement for synchronous rectification.

In U.S. Pat. application Ser. No. 492,708, filed Mar. 12, 1990 in the names of Christopher P. Henze, David S. Lo and Hubert C. Martin, Jr. and assigned to the assignee of the present invention, a single ended DC-DC power converter is disclosed which may operate with zero-voltage resonant transition switching at very high switching frequencies (1 MHz and greater). Only one magnetic element is required, which acts as both an inductor and a transformer. The turns ratio may be varied to obtain a desired voltage conversion ratio. Control-to-output characteristics are identical to conventional power converter topologies. The circuit inherently allows for zero-voltage, resonant transition switching and magnetic isolation without making special demands on the magnetic element.

SUMMARY OF THE INVENTION

A full-bridge DC-DC power converter that is coupled to an input DC power source converts the input power into DC output power which is supplied to a load. Four field-effect-transistors (FETs) are employed each of which has a gate which controls the switching of the transistor off and on and source-drain path which provides a current path when the transistor is switched on. The source-drain paths of these transistors are coupled so as to form first and second pairs of series current paths that are coupled in parallel across the input DC power source.

A pair of transformer secondary windings are provided which are wound with opposite polarity windings. An output DC capacitor is coupled to said first and second secondary windings to supply a load voltage.

A pair of primary transformer windings are coupled in series with each other, and are each coupled magnetically to only one of the secondary windings. The primary windings are wound such that they are of an opposite polarity with respect to the other and also of opposite polarity with respect to the one of said secondary windings to which they are coupled.

A timing controller is coupled to the gates of the field effect transistors that supply gating signals which control the switching of the transistors off and on such that the voltage across their respective source-drain paths is approximately zero at the time that any switching occurs.

BRIEF DESCRIPTION OF THE DRAWINGS

The present invention is described by reference to the drawings in which.

DETAILED DESCRIPTION OF THE INVENTION

Figure 1:
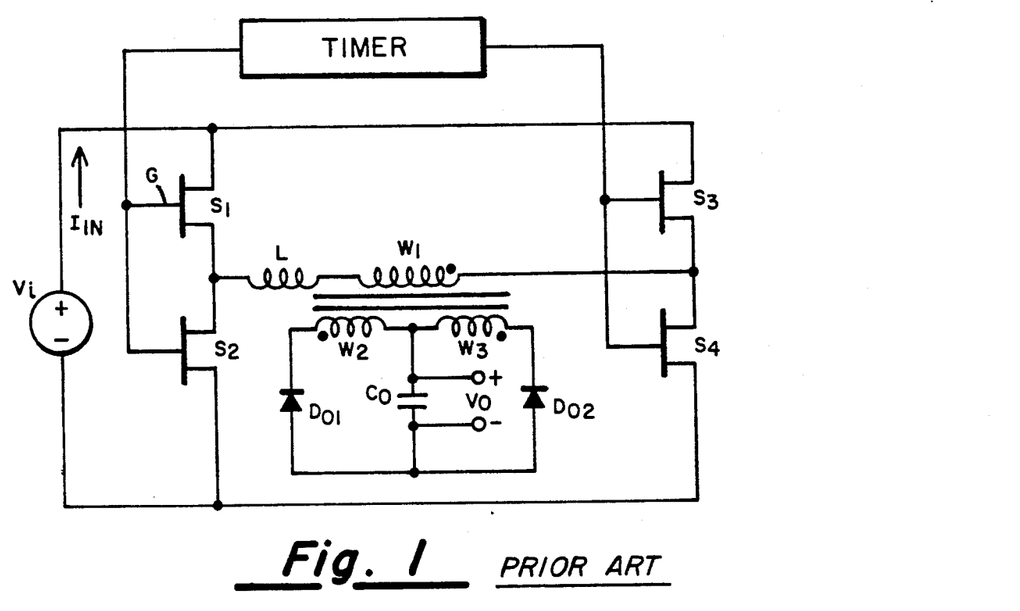
FIG. 1 is a schematic diagram of a prior art switching bridge converter.

A conventional full-bridge topology, which is similar to bridge converters of the Goldfarb article mentioned above in the Background of the Invention section, is shown in FIG. 1. Such a circuit typically has four controlled switching elements, such as $S_1$, $S_2$, $S_3$, $S_4$, which are switched transistors that are driven by timing pulses from the timer in a manner known to those skilled in the art. Such circuits commonly employ an input primary winding $W_1$, which is in series with an inductor L and a pair of output windings $W_2$, $W_3$, which alternately provide conduction current through output diode $D_{o1}$ and $D_{o2}$ to maintain an output voltage, $V_o$, across the output capacitor $C_o$ the circuit is coupled to an input voltage source, $V_i$, that supplies an input current, $I_{in}$, to the circuit.

Figure 2:
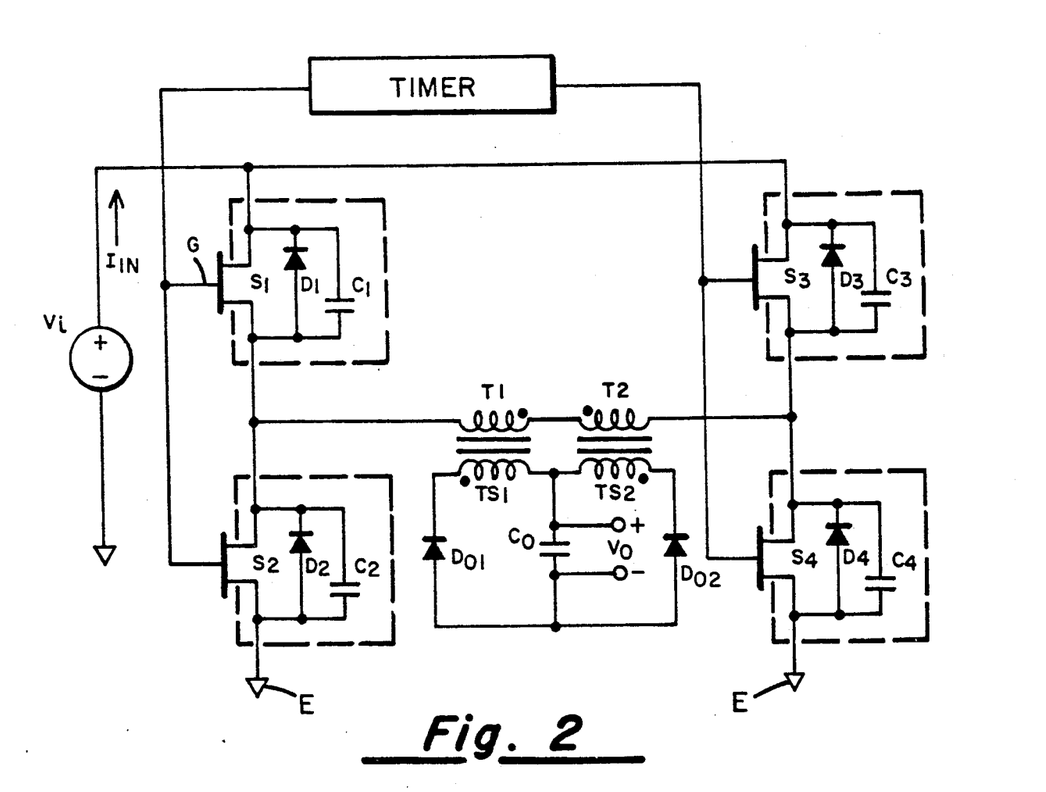
FIG. 2 is a schematic diagram of the interleaved bridge converter of the present invention.

The present invention involves a common current interleaved topology, as shown in FIG. 2, in which the current is forced to be the same in both halves of the circuit. The present invention eliminates the necessity of providing an inductor in series with the primary winding of the output transformer It also requires only four FET switching devices instead of the eight used in the converter of U.S. Pat. No. 4,953,068. In the circuit of FIG. 2 the transformers $T_1$ and $T_2$ perform the functions of voltage conversion, isolation and inductive filtering. Recent full-bridge topologies have been introduced which feature ZVRT. However, as with past designs these circuits require a series inductor in addition to the transformer. An example of such a circuit is shown in the articles discussed in the Background of the Invention section.

In the present invention, unlike prior designs, separate cores are used and each transformer individually acts as an inductor or transformer during different times of the switching cycle and carries only half of the total power. As with conventional transformers, these transformers require tightly coupled windings, but they may be formed on a gapped core to provide the required inductance.

ZVRT switching techniques, when combined with the unique structure of the full-bridge converter, allow the use of constant frequency pulse width modulation. The advantages of such fixed frequency operation are ease of power electromagnetic interference filtering, and the availability of off-the-shelf pulse-width modulation (PWM) controller circuits. This interleaved converter also reduces output ripple and offers a more compact physical design.

The switches $S_1$, $S_2$, $S_3$ and $S_4$ of the circuit of the present invention are shown in FIG. 2. A diode and a capacitor are coupled across each switching path, as shown in FIG. 2. Metal-oxide-semiconductor-field-effect-transistors (MOSFETs) inherently provide rectifying diode structures, and there is also an internal capacitance associated with each MOSFET. External diodes and capacitances could be added, if necessary. For this reason, the switching path $S_1$, the diode $D_1$ and the capacitance $C_1$ may also be supplied by a MOSFET. The inherent diode rectifier and capacitor of this transistor are shown coupled across its source-drain path in FIG. 2. Prior art circuits of the type shown in FIG. 1 have also used MOSFET transistors with the inherent diode and capacitance characteristics that are illustrated in FIG. 2 with the dotted line box that surrounds each of the transistor switches $S_1$, $S_2$, $S_3$ and $S_4$. The switching action of the MOSFET of FIG. 2 is controlled by signals on its control gate (G). In a similar manner, the switches $S_2$, $S_3$ and $S_4$ may be implemented with MOSFETs to provide corresponding inherent diode elements $D_2$, $D_3$ and $D_4$, and also corresponding inherent capacitance elements $C_2$, $C_3$ and $C_4$.

The switches $S_1$ and $S_2$ are connected directly to the input DC source $V_i$. The other side of the MOSFET switches $S_1$ and $S_3$ are connected to one of the primary windings $T_1$ and $T_2$, respectively. As shown by the block diagram, the transformer primary windings $T_1$ and $T_2$ are wound in opposite magnetic sense so that a current flowing through the windings $T_1$ and $T_2$ will produce opposing magnetic fields. The MOSFET switches $S_2$ and $S_4$ have one terminal coupled to a reference voltage, such as to ground point (E), and the other terminal is coupled to the junction point of the switch $S_1$ and the primary winding $T_1$ and to the junction point of the MOSFET switch $S_3$ and the primary winding $T_2$, respectively. The switching of the switches $S_1$, $S_2$, $S_3$, $S_4$ is controlled by the timer which supplies gating signals to all of the switches.

A secondary winding $TS_1$ is provided which is coupled to the primary winding $T_1$ and, as indicated by the black dot, is wound so that the voltage that is provided across the winding $T_1$ is inverted with respect to the output voltage across the winding $TS_1$. In a similar manner, a secondary winding $TS_2$ which is wound to provide a voltage inversion is also coupled to the primary winding $T_2$. The ends of the secondary windings $TS_1$ and $TS_2$, which are indicated by the black dots, are coupled to the cathodes of the diodes $D_5$ and $D_6$, respectively. The anodes of the diodes are coupled to a reference potential, such as ground. The output voltage $V_o$ from the secondary windings is taken across the capacitor $C_5$. As indicated in the FIG., the voltage polarity is plus on the top plate and minus on the bottom plate of the capacitor. The output currents flowing in windings $TS_1$ and $TS_2$ are $i_{o1}$ and $i_{o2}$, respectively.

Figure 3A:
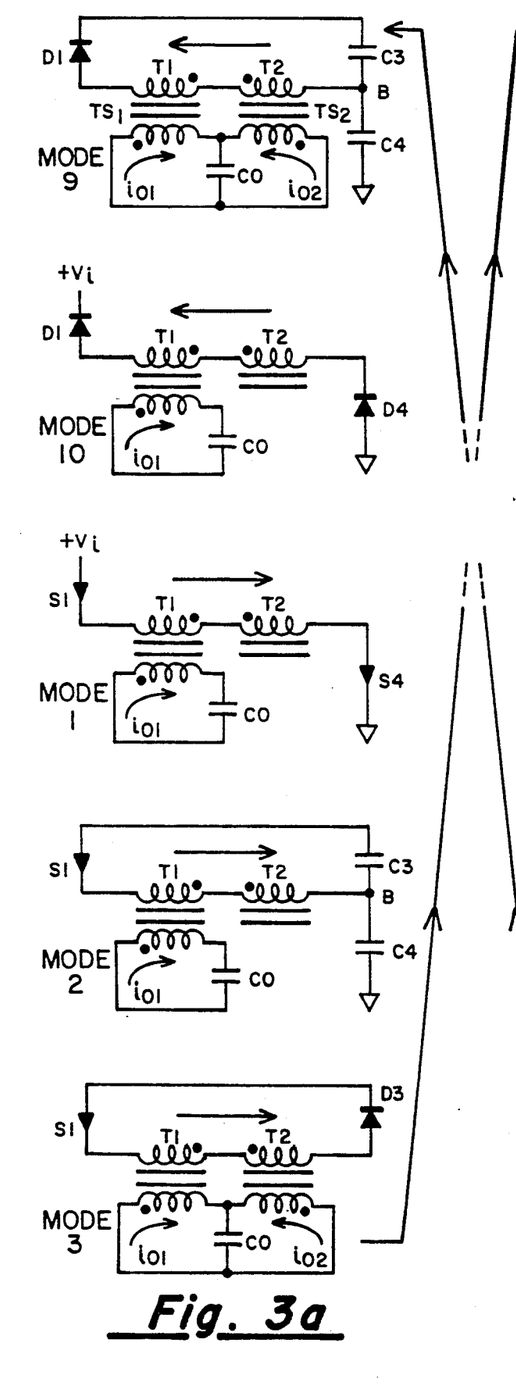
FIGS. 3a and 3b describe the conduction modes of the circuit of FIG. 2 in various operating states. As the circuit cycles from mode 1 through stage 2-10 and then back again to mode 1.
Figure 3B:
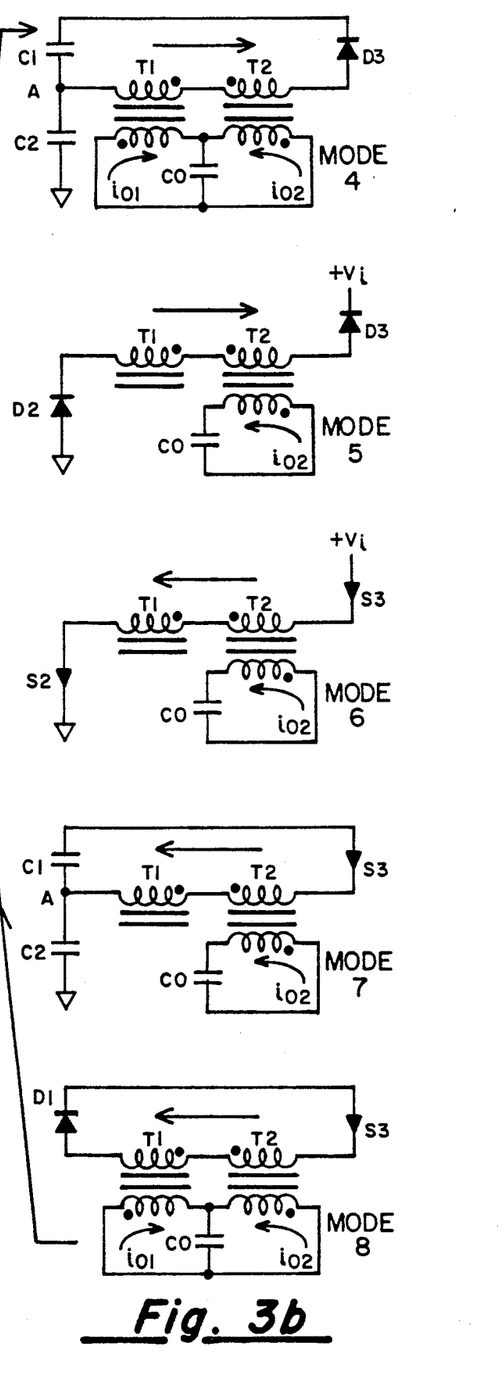
Figure 4:
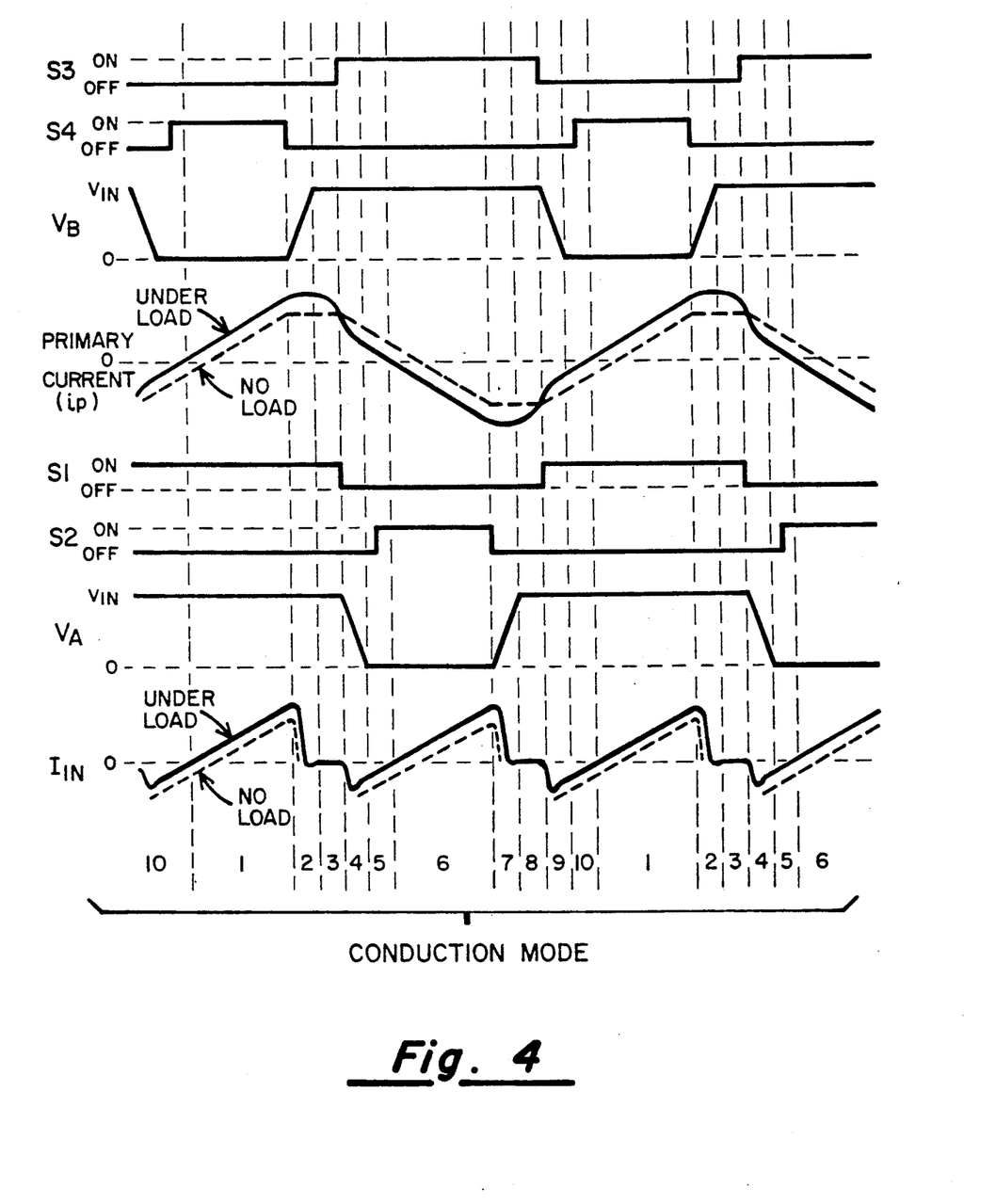
FIG. 4 is a waveform diagram which illustrates the waveforms that are present during the various modes of operation shown in FIGS. 3a and 3b.

The conduction modes and transformer currents for steady state of the converter are shown in FIG. 3. The voltage waveforms for these modes are shown in FIG. 4. The sequence of operation is as follows:

CM1: In conduction mode 1 current flows to the right through transformers $T_1$ and $T_2$ and switches $S_1$ and $S_4$ which are conducting. The transformer $T_2$ secondary is blocked from conducting by the output diode, so $T_2$ acts as an inductor storing energy in the core. Transformer $T_1$ discharges energy (stored from the last cycle) to its secondary. The CM1 conduction mode is one of the two power modes.

CM2: Turning switch $S_4$ off puts the circuit into conduction mode 2. The transformer primary current flows into the switch capacitances $C_3$ and $C_4$, which causes the voltage at point B to increase towards the voltage $V_i$. When the voltage reaches $V_i$ the switching diode $D_3$ clamps the voltage at this value and $C_3$ is discharged while $C_4$ is charged. CM3: Conduction mode 3 is entered as diode $D_3$ begins conducting With $S_1$ and $D_3$ conducting, the circuit begins to freewheel with a circulating primary current and opposing secondary current flows. With no voltage differential around the switches, the voltage across the $T_2$ primary, caused by the collapsing electromagnetic field of the primary winding $T_2$ was acting as an inductor, changes polarity, and the $TS_2$ begins conducting. Mode 3 is one of two freewheeling modes.

CM4 Turning off switch $S_1$ puts the circuit in mode 4 The primary currents flowing through $C_1$ and $C_2$ charge capacitor $C_1$ and discharge capacitor $C_2$ thereby bringing the voltage at point A close to zero.

CM5: When point A is almost zero volts, diode $D_2$ begins to conduct beginning mode 5. The voltage across $T_1$ changes polarity due to the collapsing field in this winding which shuts off current in the winding TS. During this time the switches $S_2$ and $S_3$ are turned on without losses, since the current is still flowing through the diodes.

CM6: The current will naturally reverse, due to the collapsing fields in the windings which starts conduction mode 6. Now current flows to the left through $T_2$ and $T_1$ and switches $S_2$ and $S_3$ are conducting. Transformer $T_1$ now acts as the inductor, while $T_2$ transfers the energy that was stored in it during mode 1 to the secondary. Mode 6 is the second power mode.

CM7: Switch $S_2$ is turned off to end power mode 6 and start mode 7. The primary current then flows into capacitors $C_1$ and $C_2$ and voltage rises at point A until it reaches $V_i$, at which point diode $D_1$ begins to conduct.

CM8: Conduction mode 8 starts when $D_1$ begins conducting. The circuit freewheels with both secondaries conducting, as in mode 3.

CM9: Switch $S_3$ is turned off to end the freewheel mode and enter mode 9. The primary current charges capacitor $C_3$ and discharges bringing the voltage at point B close to zero.

CM10: As diode $D_4$ begins to conduct, mode 10 begins and the $T_2$ secondary is shut off by the polarity reversal on the $T_2$ primary. Switches $S_1$ and $S_4$ are turned on during this mode to maintain zero voltage switching. The primary current will again reverse, starting the cycle over again with mode 1.

The waveform diagrams of FIG. 4 show that when the interleaved bridge converter is in the CM1 mode, the voltage at point A will be equal to the input voltage because the switch $S_1$ is closed, and the voltage B will be equal to ground because the switch $S_4$ is closed. Therefore, when this condition prevails, the current supplied by the input voltage source, which is indicated by the symbol $I_{in}$, is being supplied from the input voltage source at an increasing rate. The primary current through the windings $T_1$ and $T_2$ is equal to the input current at this time. The switches $S_2$ and $S_3$ are turned off because of the polarities of the diodes $D_5$ and $D_6$. The voltage that is induced in the secondary windings $TS_1$ and $TS_2$ will result in a current flow only through the winding $TS_1$ because the diode $D_5$ will be forward-biased, but the diode $D_6$ will be reverse-biased by the induced voltages. When this occurs the voltage across the primary winding $T_1$ will be equal to some value related to the output voltage $V_o$ between $T_1$ and the output winding $TS_1$ with turns as indicated by n. Thus, the voltage across $T_1$ is shown as being in $V_o$ in FIG. 5. The remaining voltage is dropped across the primary winding $T_2$ which is now acting as an inductor and will be the input voltage minus the voltage across to $T_1$. Therefore, some energy will be stored in the magnetic field associated with the primary winding $T_2$.

Figure 5:
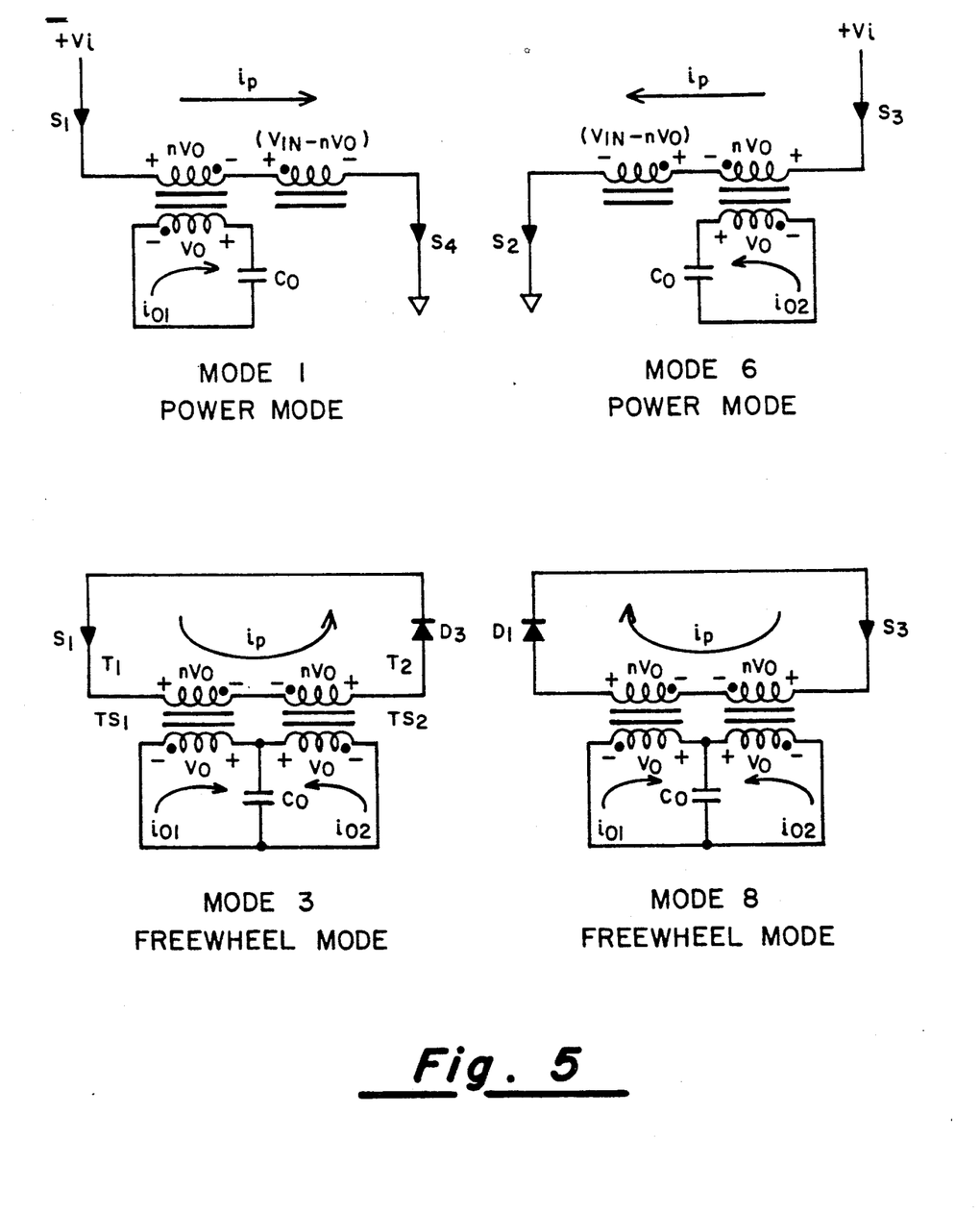
FIG. 5 represents a simplified diagram of the operation of modes 1, 3, 6 and 8.

In conduction mode 2 the switch $S_4$ is turned off. This breaks the conduction path for the input current from the input source, and, therefore, the current drops rapidly, as shown in FIG. 5. The primary current also starts to drop, but very slowly since the opening of the switch does not allow the voltage $V_B$ to rise to the input voltage instantaneously. The voltage $V_A$ remains constant since the switch $S_1$ is still closed. During this time period, the capacitor $C_4$ becomes charged while the capacitor $C_3$ is discharged.

In conduction mode 3 some more switch changes take place, but the voltage $V_B$ reaches the input voltage. Thus, there is no longer any input current from the input supply and the primary current drops further, but still at a relatively slow rate due to the energy stored in the inductance of the winding $T_2$. It is seen that the primary current is now decreasing instead of increasing which causes some of the electromagnetic field energy associated with the primary winding $T_2$ to be coupled into the secondary winding $TS_2$ as its magnetic field collapses so that the secondary winding $TS_2$ induces the current in the secondary consisting of the winding $TS_2$ and diode $D_6$, which flows in the opposite direction to the current in the loop consisting of the winding $TS_1$ and the diode $D_5$.

In conduction mode 4 switch $S_1$ is turned off and switch $S_3$ is turned off. The collapsing energy field from the winding $T_2$ then actually supplies a current back into the $V_i$ power supply, as shown in FIG. 5. As the voltage $V_A$ drops from the $V_i$ towards the $V_o$ level, the voltage across the capacitor $C_1$, therefore, charges when the voltage across $C_2$ discharges. As the primary winding is decreasing the current flows from the secondary windings $TS_1$ and $TS_2$ as set-up in mode 3 continues. As the primary current through the windings $T_1$ and $T_2$ flows through the switch $S_3$.

When mode 5 is reached when the switch $S_2$ is initially off at the start of the mode, the current in the primary winding continues to fall. However, the input current, which reaches the most negative point in mode 4, has already reversed in mode 4 without increasing in the opposite direction until at the end of mode 5 when there will no longer be any substantial current flowing into the input supply. The voltage $V_A$ during mode 5 will be at 0 and the voltage $V_B$ will be at $V_i$. Just before the primary winding reaches a 0 level, the switch $S_2$ is switched after the voltage $V_A$ is already at a ground level.

Conduction modes 6-10 are similar to the conduction modes 1-5 in that the current in the primary winding is reversed and the primary winding $T_2$ operates in the same manner in mode 6 as the primary winding $T_1$. In the corresponding modes 7-10 power output is from the secondary side $TS_2$ instead of the secondary side $TS_1$, as will be apparent from the preceding description.

It is seen, therefore, that capacitor $C_1$ is charged in mode 4 and discharged in mode 7. Capacitor $C_2$ is charged in mode 7 and discharged in mode 4. Capacitor $C_3$ is charged in mode 9 and discharged in mode 2. Capacitor $C_4$ is charged in mode 2 and discharged in mode 9.

The foregoing shows that with this power converter topology an inductance powered by one of two primary transformer windings is always in series with the load which forces the capacitor voltage swings that allow ZVRT switching to take place. Unlike other zero-voltage switching bridges, no additional series inductor is needed here. Since there is a forced, increasing current in the transformer primary while the secondary is conducting, additional current flows to the secondary in addition to that caused by releasing the stored energy in the electromagnetic field.

FIG. 5 shows a simplified version of modes 1, 3, 6 and 8. Conduction modes 2, 4, 5, 7, 9 and 10 are all transitory modes, which take up a relatively small portion of the switching cycle time. If it is assumed that switching times are zero, circuit analysis can be simplified to four modes, modes 1 and 6 which are the power modes, and modes 3 and 8 which are the freewheeling modes.

The voltage across the primaries $T_1$ and $T_2$ must average zero over one switching cycle in the steady state. In conduction with mode 1, the voltage $nV_o$ is fixed across the $T_1$ primary because the secondary is conducting. This means the voltage $V_i-nV_o$ is applied across the $T_2$ primary. During the other conduction modes (the rest of the switching cycle) the $T_2$ voltage is held to $nV_o$ due to conduction of the secondary. Setting this $T_2$ voltage equal to zero for the period T:

$$(V_i - nV_o)DT - nV_o(1 - D)T = 0$$
$$V_iD = nV_o$$

-continued
$$\frac{nV_o}{V_i} = D$$

where n is the normalized turns ratio, and D is the duty ratio. The same equation applies for the voltage across $T_1$, where duty cycle D applies to conduction mode 6. This demonstrates that this interleaved bridge topology has the voltage transfer function of a buck derived topology. Note that as D increases, conduction times of modes 3 and 8 decrease, and that D has a maximum of 0.5, or 50%. Switching times, which are assumed to be zero in this section, limit D to less than 50%.

The energy transferred by storing energy in the transformer cores is a flyback type action. This is due to flux excursion in one quadrant of the B-H curve. By forcing the transformer to transfer additional energy, while the secondary is conducting, more power can be handled by a given core size. To show that additional current flows to the secondary, again look at conduction mode 1, time $T_0$ to $T_1$. From the inductor equation, current through the $T_2$ primary is:

$$i_{L(T2)} = \frac{1}{L} \int_{t0}^{t1} (V_i - nV_o)dt$$
$$= \frac{V_i - nV_o}{L} t$$

where L is the inductance of $T_2$. The current through the $T_1$ primary, with $nV_o$ fixed across it is:

$$i_{L(T1)} = \frac{1}{L} \int_{t0}^{t1} nV_o dt$$
$$= \frac{nV_o}{L} t$$

Since these currents are not equal, the difference between the two transformer inductors must flow to the output capacitor through the $T_1$ secondary.

$$i_{T1,sec} = i_{L(T2)} - i_{L(T1)}$$
$$= \frac{V_i - 2nV_o}{L} t$$

This is the current due to the forward conducting transformer aspect. The same equations apply for mode 6. It is assumed that the input voltage is greater than 2n times the output voltage, i.e., $V_i > (2nV_o)$. The rectifier on the output ensures that this output energy cannot be returned to the primary side. Note that both the first and third quadrants of the B-H curve are utilized in the transformer cores, so that smaller cores can be used. Although diodes are shown in the descriptions, synchronous rectification, using switches instead of diodes, can be easily implemented for increased efficiency and/or low output voltages. The secondary-side diodes can be replaced with MOSFETs, and the rectifier-switch gates for $TS_1$ and $TS_2$ controlled with pulses the same as those for $S_1$ and $S_3$, respectively.

The interleaved bridge topology can reduce the cost of full range power supplies by dealing with the factors that tend to drive the cost in power supplies. The most costly components in a full temperature range power supply are large capacitors followed by the magnetics, and then semiconductor switches.

Large capacitors are usually needed for filtering the rectified outputs of the transformer secondaries. Hundreds or even thousands of microfarads of capacitance may be required for low power outputs. Low operating frequencies, which are dictated by switching losses, and discontinuous secondary currents, such as with flyback type topologies, can result in voltage ripples that must be smoothed with large capacitors. The input side of a power supply often needs filter capacitors as well for EMI concerns. Severe temperature range and reliability often force the use of tantalum capacitors. These can be quite bulky, especially at higher voltage ratings.

Ripple current ratings must also be considered, which often determine the package size and the number of capacitors. Attempts to reduce capacitance requirements by increasing operating frequency to a range where conventional switching losses are still acceptable are limited since tantalum capacitor impedance decreases sharply with increasing frequency. The interleaved bridge topology of this invention reduces capacitor requirements due to the smooth transitions between each secondary half which means small ripple so that ceramic capacitors may be used instead of bulky tantalum capacitors and transformer, inductor and capacitor volumes can be minimized. Operating frequency can be made high due to the zero ripple. Operating frequency can be made high due to the zero voltage switching (300 KHz-1MHz). This means only a few microfarads of capacitance are needed for output filtering, which can be handled by ceramic capacitors. Frequency and ripple current concerns are rarely a factor with ceramic capacitors which may be used in the converter of the present invention for many applications. Reliability with such capacitors is better. The cost is significantly less and board space is reduced.

Magnetic devices are costly mainly due to the labor costs involved in fabrication and mounting such devices. Their weight can also be an added cost factor to the overall mechanical design required to satisfy shock, vibration, and overall weight requirements. The present invention reduces the amount of magnetics because the transformer also acts as the inductor. In addition, the reduced ripple at the output means less filtering magnetics need to be used. The high operating frequencies cuts the size and weight of the transformers. Integrated magnetics, such as those made with printed wiring board windings, can reduce labor costs while improving performance.

The interleaved bridge converter of the present invention offers the potential for high reliability due to the factors mentioned in previous sections, such as the elimination of large electrolytic capacitors, and the voltage stress reduction of zero voltage resonant transition switching. ZVRT switching employed in the invention also reduces switching stresses, obviating the need for snubbers Previous work has shown that ZVRT switching significantly reduces switching loss in power FETs. This in turn allows the FET to run much cooler resulting in smaller heat sink and power supply size. The design of the invention also lends itself to the use of readily available ceramic capacitors, magnetics, switches and controllers to keep the cost low.

We claim:

1. In a full-bridge DC-DC power converter coupled to an input DC voltage source for converting input power and supplying DC output voltage to a load in which said converter consists of first, second, third and fourth field-effect transistors each of which comprises a gate for controlling the switching of said transistor off and on and a source-drain path which provides a current path when said transistor is switched on, first and second secondary windings that are wound with opposite polarity windings and are coupled to each other at a junction point of like polarity, output DC voltage source means coupled to said junction point of said first and second secondary windings, a common series current path coupled to conduct current through said source-drain paths of said first and fourth transistors during one instance of time and through said source-drain drain paths of said second and third transistors during another instance of time, wherein said series current path comprises coupling means for inductively coupling electric magnetic energy from said series current path to said first and second secondary windings, and timing control means coupled to the gates of all of said field-effect transistors constructed to supply gating signals to said gates of said transistors for controlling the switching of transistors on and off, the improvement wherein the coupling means comprises first and second primary windings connected in series with each other so as to form the only elements in said series current path, each of said first and second primary windings being coupled to only one of said first and second secondary windings, and wherein no shunt current path elements are coupled to said series current path, and said first and second primary windings are wound such that they are of an opposite polarity with respect to each other and are also of opposite polarity with respect to that one of said secondary windings to which each of said respective primary windings is coupled, and wherein said timing control means is constructed to supply said gating signals such that the voltages across all of said source-drain paths are approximately zero whenever any of said switching of said transistors occurs.

* * * * *